United States Patent [19]

Sakuma

[11] Patent Number: 5,371,770
[45] Date of Patent: Dec. 6, 1994

[54] PULSE GENERATING CIRCUIT FOR MICROCOMPUTERS

[75] Inventor: Hajime Sakuma, Tokyo, Japan

[73] Assignee: NEC Corporation, Tokyo, Japan

[21] Appl. No.: 57,847

[22] Filed: May 7, 1993

[30] Foreign Application Priority Data

May 7, 1992 [JP] Japan .................. 4-142161

[51] Int. Cl.5 .................. H03K 21/02; H03K 21/08
[52] U.S. Cl. .................. 377/39; 377/55; 377/56; 327/144; 327/291
[58] Field of Search .............. 377/39, 80, 41, 55, 377/56, 71, 86; 307/265

[56] References Cited

U.S. PATENT DOCUMENTS

| 4,566,111 | 1/1986 | Tanagawa | 377/39 |
| 4,912,734 | 3/1990 | Frauenglass | 377/20 |
| 4,989,223 | 1/1991 | Katayose et al. | 377/39 |
| 5,185,770 | 2/1993 | Tomozawa | 377/39 |

Primary Examiner—Timothy P. Callahan
Assistant Examiner—My-Trang Nu Ton
Attorney, Agent, or Firm—Young & Thompson

[57] ABSTRACT

The invention provides a pulse generating circuit including a single timer or counter which conducts both a event base count and a subsequent time base count according to clock signals about the event and time base counts, any one of which is selected by a selector. A pulse signal is generated from a RS flip-flop circuit. When the time base count follows the event base count, during the event base count, the output signal from the flip-flop is a 0 signal. During the time base count, the output signal from the flip-flop is a 1 signal. The event base count defines a delay of a pulse generated from RS flip-flop circuit and the time base count defines a width of the pulse.

14 Claims, 3 Drawing Sheets

PULSE GENERATING CIRCUIT FOR MICROCOMPUTERS

BACKGROUND OF THE INVENTION

The invention relates to a pulse generating circuit for microcomputers, and more particularly to a pulse generating circuit in which a time base clock and an event base clock are made to realize its synchronous operation.

One of various fundamental types of configurations of pulse generating circuits is a pulse generating circuit in which a time or the number of occurrences of events is counted by counters or timers to realize a synchronized pulse generating operation. Generally, timers or counters are used for implementation of the synchronous operation of the pulse generating circuit. The pulse generating circuit includes timers, compare registers and a flip-flop circuit. Previous to the counting of time or the number of occurrences of events, predetermined count values about both time and the number of occurrences of events are set or stored in the compare resisters, after which the timer initiates the count up of times or events. When the count value of the timer corresponds to the predetermined values set in the compare register, the compare register generates and subsequently delivers a correspondence signal which means the correspondence between the current count value in the time count or the event count and the predetermined count value set in the compare register. When the correspondence between the current count value and the predetermined count value is confirmed, the flip-flop is activated for a generation and a subsequent delivery of the pulse signal.

As described the above, there exit two types of count, and thus one is the count of times and the other is the count of the number of occurrences of events. Needless to say, both the above counts by the timer or counter, and thus the time counts and the event counts are available to realize the synchronous pulse generating operation. In the prior arts, the timers or the counters are basically required for the time count and the event counts respectively. Namely, it is necessary to use both a timer for the time count and a timer for the event count. If a single timer or a counter is used, it is necessary to select the time count mode or and the event count mode prior to the initiation of the counting operation. However, if the time count and the event count are hybridized in the count operation for a single pulse output, at least two timers or counters are used. A typical conventional configuration of the pulse generating circuit will be described with reference to FIGS. 1 and 2.

The conventional pulse generating circuit includes first and second timers 1 and 13, first and second compare registers 10 and 11, a capture register 12 and a SR flip-flop circuit 6. The first timer 1 conducts the event count and the first compare register 10 compares the values about the event counts. The second timer 13 conducts the time count and the second compare register 11 compares the values about the time counts. A reference signal INTP on a line 2 causes the first timer 1 to RESET, and thus to be cleared for a subsequent initiation of the event count operation. The first timer 1 fetches an external event signal TI as a clock signal on a line 4 for a count of the number of the occurrences of events. Since the event count and the time count are exclusive, during the event count operation, the time base count operation is not useful. During the event counts, a 0 signal occurs on the S (SET) input line of the flip-flop 6 and a 1 signal occurs on the R (RESET) input line of the flip-flop 6 thereby the flip-flop takes the RESET state or the 0 state and thus a 1 state of the pulse signal TO occurs the output line 7 of the flip-flop 6. A predetermined value about the event count is set or stored in the first compare register 10. The compare register 10 fetches the current count value of the number of the external event occurrences from the first timer 1 for a subsequent comparison of the current count value with the predetermined value set or stored therein. The count up operation of the event occurrences is continued until the present count up value reaches the predetermined value set in the compare register 10. If the correspondence between the current count value of the number of the external event occurrences and the predetermined value set or stored in the compare register 10 is confirmed, the compare register 10 generates a correspondence signal 5 which means the correspondence between the current count value and the predetermined value. When the correspondence signal occurs at the first compare register 10, the count up operation of the even occurrences is completed.

Such correspondence signal 5 is further transmitted as an interrupt signal to an interrupt controller which is not illustrated. The interrupt controller receives various interrupt for a subsequent control thereof according to those priorities. After that the interrupt controller provides a controlled interrupt to a CPU (central processing unit) which is not illustrated. During the interrupt processing, the CPU fetches the counting value stored in the capture register 12 for addition of the fetched counting value and a predetermined value. A value provided by the addition between the fetched counting value and the predetermined value is stored in the second compare register 12.

The occurrence of the correspondence signal 5 also provides a timing of the capture to the capture register 12. The capture register 12 captures the present count up value from the second timer 13.

The occurrence of the correspondence signal 5 also the flip-flop 6 activates. Thus, a 1 signal occurs on the S input line of the flip-flop 6 and a 0 signal occurs on the R input signal line of the flip-flop 6 thereby the output signal TO occurring on the output line 7 of the flip-flop 6 takes the 1 state so that the flip-flop 6 takes the SET state. Following the completion of the counting up operation of the event occurrences by the first timer 1, the second timer initiates a count up operation of times. The second timer 13 fetches time signals which occurs on a line 3 as clock signals for a count up operation about the time. The count up operation of the time is continued until the correspondence between the present count value of the time and the predetermined value set in the compare register 11 appears. During the count up of the time, the flip-flop 6 remains at the SET state or the activated state. When the correspondence between the present count up value of the second timer 13 and the predetermined value set in the second compare register 11 is confirmed, the flip-flop 6 takes an inactivated state or the RESET state. Thus, the output signal TO on the output line 7 of the flip-flop 6 becomes a 0 state thereby the counting up of the time is completed.

The output signal on the output line 7 of the flip-flop 6 has the wave-form illustrated in FIG. 2. As described the above, a predetermined value T1 about the event count is set in the first compare register 10 prior to the initiation of the counting up operation by the first timer 1. The counting up operation of the event occurrences is continued until the correspondence between the present count value of the first timer 1 and the predetermined value T1 set in the first compare register 10 appears. In the meantime, the flip-flop 6 remains the RESET state and thus the output signal TO on the output line 7 of the flip-flop 6 remains the 0 state. The occurrence of the correspondence between the present count up value of the first timer 1 and the predetermined value T1 set in the first compare register 10 makes the flip-flop 6 activated. Thus, the flip-flop 6 takes the SET state thereby resulting in a 1 state of the output signal TO of the flip-flop 6. The second timer 13 initiates the count up operation of the time. The counting up operation of the time by the second timer 12 is continued until the present count value of the second timer 13 reaches a predetermined value T1+T2. In the meantime, the flip-flop 6 remains as the SET state. When the correspondence between the present count value of the time and the predetermined value T1+T2 is confirmed, the flip-flop 6 becomes the inactivated state or the RESET state. The output signal TO of the flip-flop 6 becomes the 0 state.

That is why the time count and the event count are conducted in a single pulse generating operation. In the above system, the external event base count, for example, T1 defines the delay in the pulse signal from the external reference signal INTP which makes the timer initiate the count operation and the time base count, for example, T2 defines the width of the pulse. Contrary to the above, it is of course available that the time base count defines the delay in pulse signal from the external reference signal INTP and the event base represents the width of the pulse.

As described the above, the conventional configuration of the pulse generating circuit requires at least two timers, and thus one is for the time count and other is for the event count. The use of the two timers in each of the pulse generating circuit is disadvantageous in view of the hardware. Such disadvantages are considerable when a large number of the pulse generating signals are used for the microcomputers. It is desirable to provide a novel circuit configuration which will allow the time base count and the event base count to be realized in a pulse generating operation by use of a single timer only.

SUMMARY OF THE INVENTION

It is a primary object of the present invention to provide a novel pulse generating circuit for microcomputers.

It is a further object of the present invention to provide a novel pulse generating circuit including a single timer which conducts both a time base count and an event base count.

The above and other objects, features and advantages of the present invention will be apparent from the following descriptions.

The invention provides a novel pulse generating circuit for microcomputers which has a single counter for conducting both a time base clock count and an event base clock count. A first transmission line transmits a reference signal to the counter so that the reference signal causes the counter to be cleared for a subsequent initiation of count. A second transmission line transmits clock signals about the time base count. A third transmission line transmits clock signals about the event base count. A selector is connected to the second and third lines and connected to the single counter for selecting any one of the clock signals about the time base count and the event base count for a subsequent supply of the selected signal to the counter. A first compare register is connected to the counter for storing values about the event base count. The first compare register fetches a count value of the event base count from the counter for a subsequent comparison of the fetched count value with a predetermined value stored therein. The first compare register is also connected to the selector for supplying a signal to the selector only when occurrence of a correspondence between the count value of the counter and the predetermined value stored therein so that the selector shifts from its one select state and another select state. A second compare register is connected to the counter for storing storing values about the time base count. The second compare register fetches a count value of the time base count from the counter for a subsequent comparison of the fetched count value with a predetermined value stored therein. The second compare register is also connected to the selector for supplying a signal to the selector only when occurrence of a correspondence between the count value of the counter and the predetermined value stored therein so that the selector shifts from its one select state to another select state. An SR flip-flop circuit is connected the first and second compare registers for generating binary digit pulse signals according to input signals from the first and second compare registers.

BRIEF DESCRIPTION OF THE DRAWINGS

The embodiments of the present invention will hereinafter fully be described in detail with reference to the accompanying drawings.

PREFERRED EMBODIMENTS OF THE INVENTION

The invention provides a novel pulse generating circuit structure including a single timer or counter which conducts both the time base count and the event base count.

Figure 1:
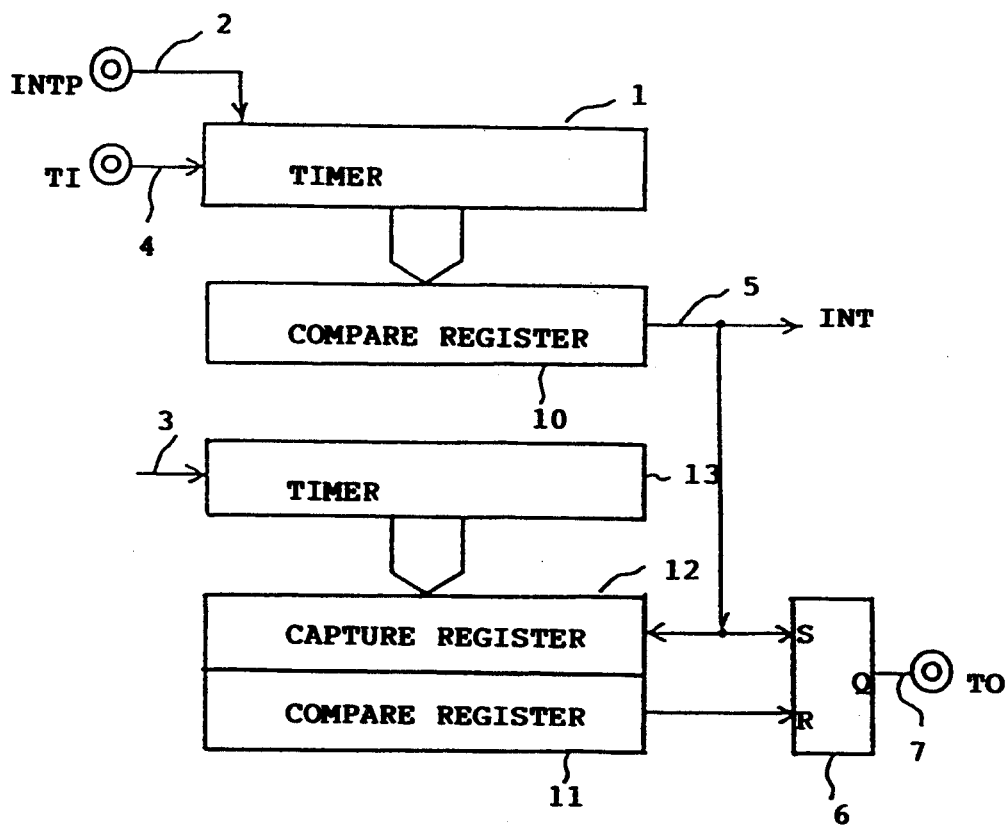
FIG. 1 is a diagram illustrative of the configuration of the conventional pulse generating circuit for microcomputers.
Figure 2:
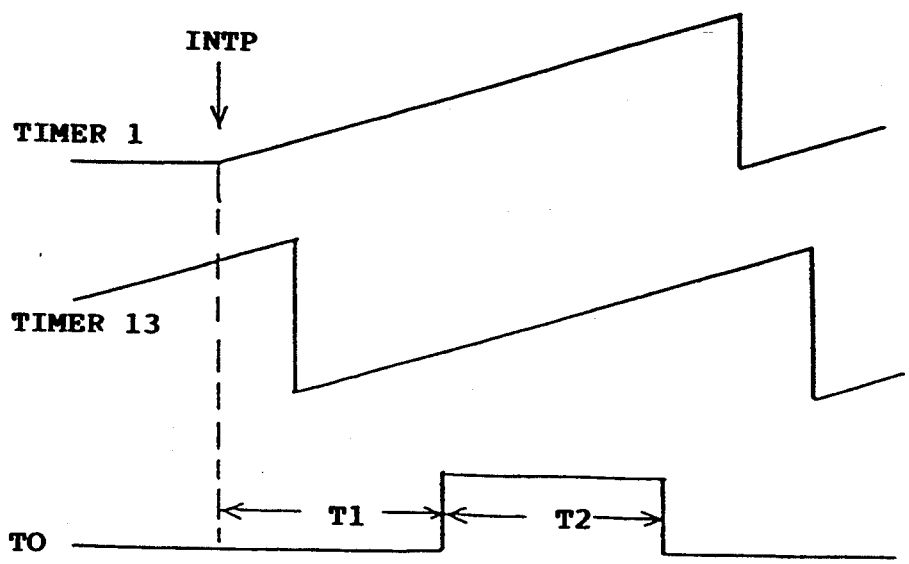
FIG. 2 is a diagram illustrative of the wave-forms of the output signal of the flip-flop in the conventional pulse generating signal illustrated in FIG. 1.
Figure 3:
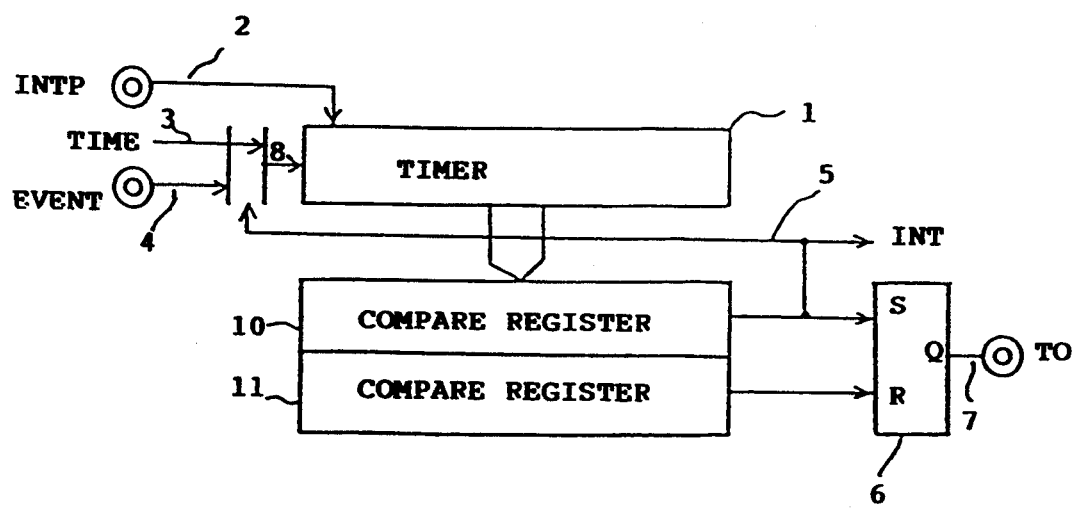
FIG. 3 is a diagram illustrative of a configuration of a novel pulse generating circuit for microcomputers in a first embodiment according to the present invention.
Figure 4:
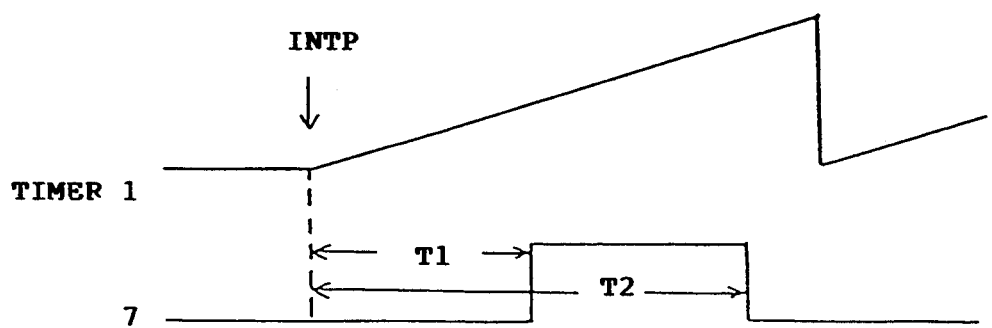
FIG. 4 is a diagram illustrative of the wave-forms of the output signal of the flip-flop in a novel pulse generating signal illustrated in FIG. 3.

A first embodiment according to the present invention will be described with reference to FIGS. 3 and 4.

A configuration of a novel pulse generating circuit will be described with reference to FIG. 3. A novel pulse generating circuit and a CPU (central processing unit) of a microcomputer not illustrated are formed on a single semiconductor substrate. The novel pulse generating circuit includes a timer 1, first and second compare registers 10 and 11, a selector 8 and an SR flip-flop circuit 6. The timer 1 has functions of both the time base count and the event base count. The first compare register 10 is to store informations about the event base count. The second compare register 11 is to store informations about the time base count. The SR flip-flop 6 has input lines or S(SET) and R(RESET) and an output line 7. When 0 signals are applied on both the SET and RESET lines of the flip-flop 6, the flip-flop 6 remains in the present state. When a 0 signal is applied on the SET line of the flip-flop 6 and a 1 signal is applied on the RESET line of the flip-flop 6, the flip-flop 6 takes the RESET state or the 0 state, resulting in a 0 output signal. When a 1 signal is applied on the SET line of the flip-flop 6 and a 0 signal is applied on the RESET line of the flip-flop 6, the flip-flop 6 takes the SET state or the 1 state, resulting in a 1 output signal, in the meantime, the pulse signal appears. When 1 signals are applied on both the SET and RESET lines of the flip-flop 6, the flip-flop 6 is not useful. The timer 1 receives a reference signal INTP as an external event signal which causes the timer 1 to be cleared for initiation of the count operation. The timer 1 also receives either clock signals about the times transmitted on a line 3 or clock signals about the external events transmitted on a line 4 through a selector 8 which selects either the time signals on the line 3 or the event signals on the line 4. The first and second compare registers 10 and 11 fetch a present count value about the time base count or the event base count from the timer 1.

The operation of the novel pulse generating circuit will be described with reference to FIGS. 3 and 4.

When the external reference signal INTP is transmitted on the line 2 and then the timer 1 receives the signal INTP, the timer 1 is cleared for a subsequent initiation of counting up operation of the time base count or the event base count. In this embodiment, it will be assumed that the event base count defines the delay of the initiation of the pulse generation from the occurrence of the reference signal INTP as a count initiation signal for the timer 1 and the time base count defines the width of the pulse. Prior to the initiation of the counting up operation about the event base count by the timer 1, a predetermined value T1 about the event count, which will define the delay of the pulse from the initiation of the counting up operation by the timer 1, is stored in the first compare register 10. The selector 8 selects the external event signal on the line 4. After the timer 1 receives the external reference signal INTP, the timer 1 initiates an event base count up operation according to the event signal supplied on the line 4 through the selector 8. The event base count up operation is continued until the count value corresponds to the predetermined value T1 set in the first compare register 10. The selector 8 keeps the external event signal selected. In the meantime, a 0 signal is applied on the SET line of the flip-flop 6 and a 1 signal is applied on the RESET line of the flip-flop 6 so that the flip-flop 6 takes the inactive state or the RESET state, resulting in occurrence of a 0 output signal on the output line 7 of the flip-flop 6, and thus no pulse signal appears on the output line 7 of the flip-flop 6.

During the counting up operation of the event base count, the first compare register 10 keeps fetching the current count value of the event base count from the timer 1 for a comparison between the fetched present count value and the predetermined value T1 set therein. When the count value of the event base count by the timer 1 reaches the predetermined value T1 set in the first compare register 10, the first compare register 10 confirms the correspondence between the present count value and the predetermined value T1 set therein. At that time, the compare resister 10 generates a correspondence signal 5 which means that the correspondence between the present count value and the predetermined value T1 set therein has occurred. The correspondence signal 5 is transmitted to the selector 8 so as to cause the selector 8 to shift from the external event signal on the line 4 to the time signal comprising a clock signal on the line 3. This results in that the selector 8 selects the time clock signal for supplying the arithmetic result to the timer 1. The correspondence signal 5 is also transmitted to an interrupt controller which is not illustrated where the correspondence signal 5 serves as an interrupt signal INT. The interrupt controller receives various interrupt signals for a control thereof according to those priorities and a subsequent provision of interrupt to the CPU (central processing unit) of the microcomputer. After the receipt of the interrupt, the CPU captures the current count value from the first compare register 10, and then determines a value provided by addition of a value T2 with the value T1 and subsequently have the same stored in the second compare register 11._

When the correspondence signal 5 occurs, a 1 signal occurs on the SET line of the flip-flop 6 and a 0 signal occurs on the RESET line of the flip-flop 6, thereby the flip-flop takes the SET state or the active state. The output signal TO on the output line 7 of the flip-flop 6 is a 1 signal. The timer 1 initiates the time base count up operation according to the time signals supplied from the line 3 through the selector 8. In the meantime, the second compare register 11 fetches the present count value of the time base count from the timer 1 for a comparison of the count value of the timer 1 with the predetermined value T1+T2 set therein. The time base count up operation by the timer 1 is continued until the time base count up value of the timer 1 reaches the predetermined value T1+T2 set in the second compare register 11.

During the counting up operation of the time base count, the second compare register 11 keeps fetching the current count value of the time base count from the timer 1 for a comparison between the fetched present count value and the predetermined value T1+T2 set therein. When the count value of the time base count by the timer 1 reaches the predetermined value T1+T2 set in the second compare register 11, the second compare register 11 confirms the correspondence between the present count value and the predetermined value T1+T2 set therein. At that time, the second compare resister 11 generates a correspondence signal which means that the correspondence between the present count value and the predetermined value T1+T2 set therein has occurred. At that time, a 0 signal occurs on the SET line of the flip-flop 6 and a 1 signal occurs on the RESET line of the flip-flop 6, thereby the flip-flop 6 takes the RESET state or the inactive state. The output signal TO on the output line 7 of the flip-flop 6 is a 0 signal. The pulse signal occurrence is completed. Therefore, the pulse signal occurs for the time period T2. Namely, the pulse signal having both the width of T2 and the delay of T1 from the external reference signal INTP as the initiation signal is generated from the pulse generating circuit.

From the above descriptions, it is understood that the selection by the selector 8 of either the time signal on the line 3 or the event signal on the line 4 allows a single timer 1 or counter to perform both the event and time base counts for a generation of a single pulse signal. Such circuit configuration requires only a single timer, although the different two count operations, or the time base count operation and the event base count operation are performed.

As a modification of the first embodiment, it is possible that the time base count defines the delay of the initiation of the pulse generation from the occurrence of the reference signal INTP as a count initiation signal for the timer 1 and the event base count defines the width of the pulse. In this case, previous to the initiation of the count up operation by the timer 1, the selector 8 selects the time signal on the line 3 and further the second compare register 11 stores the predetermined value T1. After the occurrence of the reference signal INTP, the timer 1 initiates the time base count up operation according to the time signal supplied from the line 3 through the selector 8. In the meantime, a 0 signal is applied on the SET line of the flip-flop 6 and a 1 signal is applied on the RESET line of the flip-flop 6 so that the flip-flop 6 takes the RESET state or the inactive state, thereby resulting in that a 0 output signal occurs on the output line 7 of the flip-flop 6. Thus, no pulse signal occurs from the flip-flop 6 of the pulse generating circuit. The second compare register 11 keeps capturing the current count value from the timer 1. The time base count up operation by the timer 1 is continued until the second compare resister 11 confirms the correspondence between the count value of the timer 1 and the predetermined value T1 set in the second compare register 11.

When the correspondence between the count value of the timer 1 and the predetermined value T1 appears, the second compare register 11 generates a correspondence signal which is transmitted to the selector 8 so as to cause the selector 8 to exhibit a shift performance from the time signal on the line 3 to the event signal on the line 4. A value T1+T2 is stored in the first compare register 10. When the occurrence of the correspondence signal, a 1 signal is applied on the SET line of the flip-flop 6 and a 0 signal is applied on the RESET line of the flip-flop 6 so that the flip-flop 6 takes the SET state or the active state, thereby resulting in that a 1 output signal occurs on the output line 7 of the flip-flop 6. Thus, a pulse signal occurs from the flip-flop 6 of the pulse generating circuit. The timer 1 initiates the event base count operation according to the event signal supplied though the selector 8 from the line 4. The first compare register 10 keeps capturing the current count value from the timer 1. The event base count up operation by the timer 1 is continued until the first compare resister 10 confirms the correspondence between the count value of the timer 1 and the predetermined value T1+T2 set in the first compare register 10.

When the correspondence between the count value of the timer 1 and the predetermined value T1+T2 appears, a 0 signal is applied on the set line of the flip-flop 6 and a 1 signal is applied on the RESET line of the flip-flop 6 so that the flip-flop 6 takes the RESET state or the inactive state, thereby resulting in that a 0 output signal occurs on the output line 7 of the flip-flop 6. The pulse signal occurrence is completed. That is how the time base count and the subsequent event base count are performed by use of the single timer 1 only.

Figure 5:
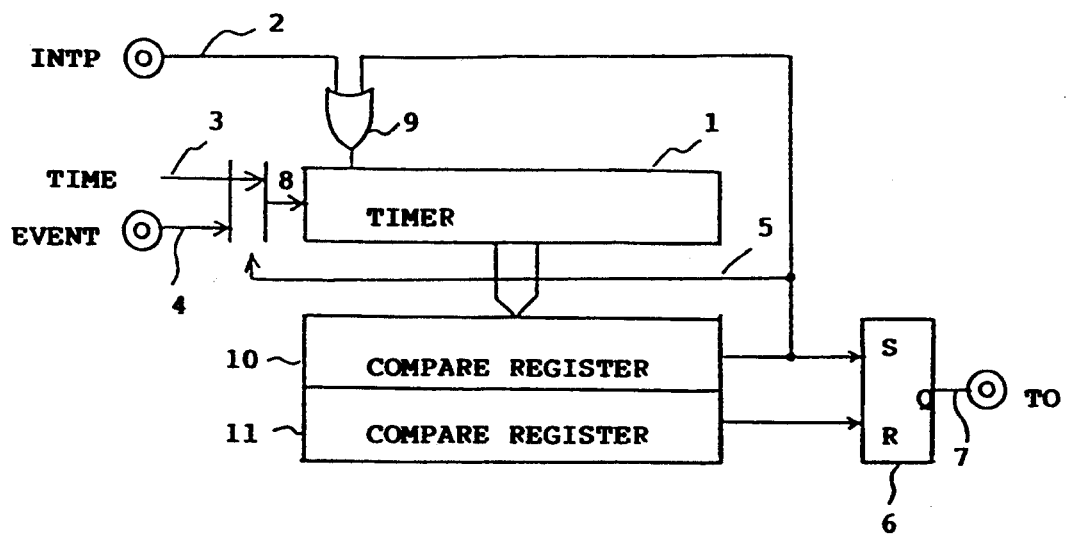
FIG. 5 is a diagram illustrative of a configuration of a novel pulse generating circuit for microcomputers in a second embodiment according to the present invention.
Figure 6:
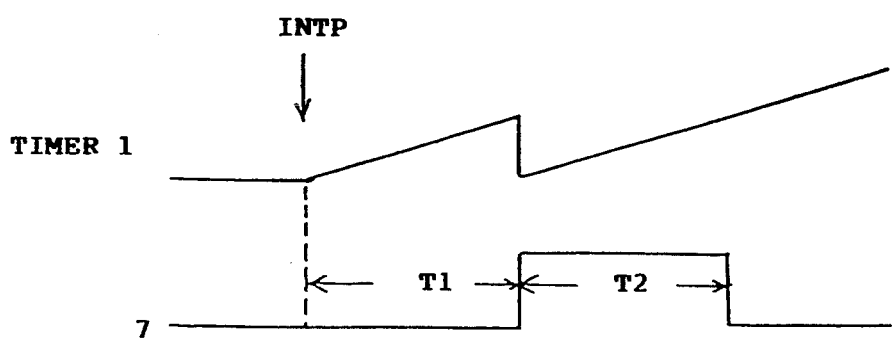
FIG. 6 is a diagram illustrative of the wave-forms of the output signal of the flip-flop in a novel pulse generating signal illustrated in FIG. 5.

A second embodiment according to the present invention will be described with reference to FIGS. 5 and 6.

A configuration of a novel pulse generating circuit will be described with reference to FIG. 5. The configuration and operation of a novel pulse generating circuit of the second embodiment is analogous to that of the first embodiment, except that a timer or counter is cleared when a change from the event base count occurs to the time base count. The novel pulse generating circuit and a CPU (central processing unit) of a microcomputer not illustrated are formed on a single semiconductor substrate. The novel pulse generating circuit includes a timer 1, first and second compare registers 10 and 11, a selector 8, an OR gate circuit 9 and a SR flip-flop circuit 6. The timer 1 has functions of both the time base count and the event base count. The OR gate circuit 9 is to have the timer 1 cleared when change between the event base count and the time base count. The first compare register 10 stores informations about the event base count. The second compare register 11 is to stores information about the time base count. The SR flip-flop 6 has input lines or S(SET) and R(RESET) and an output line 7. A reference signal INTP as an external event signal is transmitted from a line 2 through the OR gate circuit 9 to the timer 1. The timer 1 receives the reference signal INTP which causes the timer 1 to be cleared for initiation of the count operation. The timer 1 also receives either clock signals about the times transmitted on a line 3 or clock signals about the external events transmitted on a line 4 through a selector 8 which selects either the time signals on the line 3 or the event signals on the line 4. The first and second compare registers 10 and 11 fetch a present count value about the time base count or the event base count from the timer 1.

The operation of the novel pulse generating circuit will subsequently be described with reference to FIGS. 5 and 6.

When the external reference signal INTP is transmitted from the line 2 through the OR gate circuit 9 to the timer 1 and thus the timer 1 receives the signal INTP, the timer 1 is cleared for a subsequent initiation of counting up operation of the time base count or the event base count. In this embodiment, it will be assumed that the event base count defines the delay of the initiation of the pulse generation from the occurrence of the reference signal INTP as a count initiation signal for the timer 1 and the time base count defines the width of the pulse. Prior to the initiation of the counting up operation about the event base count by the timer 1, a predetermined value T1 about the event count, which will define the delay of the pulse from the initiation of the counting up operation by the timer 1, is stored in the first compare register 10. Contrary to the first embodiment, in the second embodiment, a predetermined value T1 about the event count, which will define the width of the pulse signal, is stored in the second compare register 11. The selector 8 selects the external event signal on the line 4. After the timer 1 receives the external reference signal INTP, the timer 1 initiates an event base count up operation according to the event signal supplied on the line 4 through the selector 8. The event base count up operation is continued until the count value corresponds to the predetermined value T1 set in the first compare register 10. The selector 8 keeps the external event signal selected. In the meantime, a 0 signal is applied on the SET line of the flip-flop 6 and a 1 signal is applied on the RESET line of the flip-flop 6 so that the flip-flop 6 takes the inactive state or the RESET state, resulting in occurrence of a 0 output signal on the output line 7 of the flip-flop 6, and thus no pulse signal appears on the output line 7 of the flip-flop 6.

During the counting up operation of the event base count, the first compare register 10 keeps fetching the current count value of the event base count from the timer 1 for a comparison between the fetched present count value and the predetermined value T1 set therein. When the count value of the event base count by the timer 1 reaches the predetermined value T1 set in the first compare register 10, the first compare register 10 confirms the correspondence between the present count value and the predetermined value T1 set therein. At that time, the compare resister 10 generates a correspondence signal 5 which means that the correspondence between the present count value and the predetermined value set therein occurs. The correspondence signal 5 is transmitted to the selector 8 so as to cause the selector 8 to shift from the external event signal on the line 4 to the time signal comprising a clock signal on the line 3. This results in that the selector 8 selects the time clock signal for supplying the same to timer 1.

Additionally, it is important for the second embodiment that the correspondence signal 5 is transmitted through the OR gate circuit 9 to the timer 1 so as to have the timer 1 cleared. Namely, the timer 1 again initiates the count up operation from count zero. It is thus possible that the value T2 about the time count is stored in the second compare register 11 prior to the occurrence of the reference signal INTP on the line 2. This allows the operation to be free from that the correspondence signal 5 is transmitted to an interrupt controller which is not illustrated for a subsequent provision of interrupt to the CPU (central processing unit) of the microcomputer. This allows the operation to be free from that the CPU captures the current count value from the first compare register 10, and then determines a value provided by addition of a value T2 with the value T1 and subsequently have the arithmetic result stored in the second compare register 11.

When the correspondence signal 5 occurs, a 1 signal occurs on the SET line of the flip-flop 6 and a 0 signal occurs on the RESET line of the flip-flop 6, thereby the flip-flop takes the SET state or the active state. The output signal TO on the output line 7 of the flip-flop 6 is a 1 signal. The timer 1 initiates the count up operation from zero count but about the time base according to the time signals supplied from the line 3 through the selector 8. In the meantime, the second compare register 11 fetches the present count value of the time base count from the timer 1 for a comparison of the count value of the timer 1 with the predetermined value T2 set therein. The time base count up operation by the timer 1 is continued until the time base count up value of the timer 1 reaches the predetermined value T2 set in the second compare register 11.

During the counting up operation of the time base count, the second compare register 11 keeps fetching the current count value of the time base count from the timer 1 for a comparison between the fetched present count value and the predetermined value T2 set therein. When the count value of the time base count by the timer 1 reaches the predetermined value T2 set in the second compare register 11, the second compare register 11 confirms the correspondence between the present count value and the predetermined value T2 set therein. At that time, the second compare register 11 generates a correspondence signal which means that occurrence of the correspondence between the present count value and the predetermined value T2 set therein has occurred. At that time, a 0 signal occurs on the SET line of the flip-flop 6 and a 1 signal occurs on the RESET line of the flip-flop 6, thereby the flip-flop 6 takes the RESET state or the inactive state. The output signal TO on the output line 7 of the flip-flop 6 is a 0 signal. The pulse signal occurrence is completed. Therefore, the pulse signal occurs for the time period T2. Namely, the pulse signal having both the width of T2 and the delay of T1 from the external reference signal INTP as the initiation signal is generated from the pulse generating circuit.

From the above descriptions, it is understood that the selection by the selector 8 of either the time signal on the line 3 or the event signal on the line 4 allows a single timer 1 or counter only to perform both the event and time base counts for a generation of a single pulse signal. Such circuit configuration requires a single timer only, although the different two count operations, or the time base count operation and the event base count operation are performed.

In addition, the pulse generating circuit of the second embodiment has such a configuration as to have the timer 1 cleared when the change from the event count up operation to the time count up operation thereby the operation is free from any software overheads such as interruption processes.

As a modification of the second embodiment, it is possible that the time base count defines the delay of the initiation of the pulse generation from the occurrence of the reference signal INTP as a count initiation signal for the timer 1 and the event base count defines the width of the pulse. In this case, previous to the initiation of the count up operation by the timer 1, the selector 8 selects the time signal on the line 3. Further, the first and second compare registers 10 and 11 store the predetermined values T1 and T2 respectively. After the occurrence of the reference signal INTP, the timer 1 initiates the time base count up operation according to the time signal supplied from the line 3 through the selector 8. In the meantime, a 0 signal is applied on the SET line of the flip-flop 6 and a 1 signal is applied on the RESET line of the flip-flop 6 so that the flip-flop 6 takes the RESET state or the inactive state, thereby resulting in occurrence of a 0 output signal on the output line 7 of the flip-flop 6. Thus, no pulse signal occurs from the flip-flop 6 of the pulse generating circuit. The second compare register 11 keeps capturing the current count value from the timer 1. The time base count up operation by the timer 1 is continued until the second compare resister 11 confirms the correspondence between the count value of the timer 1 and the predetermined value T1 set in the second compare register 11.

When the correspondence between the count value of the timer 1 and the predetermined value T1 appears, the second compare register 11 generates a correspondence signal which is transmitted to the selector 8 so as to cause the selector 8 to exhibit a shift from the time signal on the line 3 to the event signal on the line 4. Concurrently, the correspondence signal is transmitted though the OR gate circuit 9 to the timer 1 so that the timer 1 is cleared for a subsequent count up operation from zero count. Upon the occurrence of the correspondence signal, a 1 signal is applied on the SET line of the flip-flop 6 and a 0 signal is applied on the RESET line of the flip-flop 6 so that the flip-flop 6 takes the SET state or the active state, thereby resulting in that a 1 output signal occurs on the output line 7 of the flip-flop 6. Thus, a pulse signal occurs from the flip-flop 6 of the pulse generating circuit. The timer 1 initiates the event base count operation according to the event signal supplied though the selector 8 from the line 4. The first compare register 10 keeps capturing the current count value from the timer 1. The event base count up operation by the timer 1 is continued until the first compare resister 10 confirms the correspondence between the count value of the timer 1 and the predetermined value T2 set in the first compare register 10.

When the correspondence between the count value of the timer 1 and the predetermined value T2 appears, a 0 signal is applied on the SET line of the flip-flop 6 and a 1 signal is applied on the RESET line of the flip-flop 6 so that the flip-flop 6 takes the RESET state or the inactive state, thereby resulting in that a 0 output signal occurs on the output line 7 of the flip-flop 6. The occurrence of pulse signal is completed. That is how the time base count and the subsequent event base count are performed by use of the single timer 1 only.

Whereas modifications of the present invention will no doubt be apparent to a person having ordinary skill in the art, to which the invention pertains, it is to be understood that the embodiments shown and described by way of illustrations are by no means intended to be considered in a limiting sense. Accordingly, it is to be intended to cover by claims all modifications which fall within the spirit and scope of the invention.

What is claimed is:

1. A pulse generating circuit for microcomputers comprising:
    a single count means for conducting both a timer-based clock count and an event-based clock count,
    a first transmission line for transmitting a reference signal to said single count means, said reference signal causing said single count means to be cleared to allow for an initiation of a count;
    a second transmission line for transmitting clock signals corresponding to said time-based count;
    a third transmission line for transmitting clock signals corresponding to said event-based count;
    controllable selecting means connected to said second and third transmission lines and connected to said single count means for selecting one of said clock signals corresponding to said time-based count and to said event-based count, said selected clock signal being input to said single count means;
    a first storage and comparison means connected to said single count means for storing values corresponding to said event-based count, said first storage and comparison means fetching a current event-based count from said single count means to compare said fetched event-based count with a predetermined value stored in said first storage and comparison means, said first storage and comparison means being connected to said controllable selecting means, an output of said first storage and comparison means supplying a control signal to said controllable selecting means only when said current count value of said single count mean and said predetermined value stored in said first storage and comparison means are equal, said control signal causing said controllable selecting means to shift from said third transmission line for transmitting clock signals corresponding to said event-based count to said second transmission line for transmitting clock signals corresponding to said time-based count;
    a second storage and comparison means connected to said single count means for storing values corresponding to said time-based count, said second storage and comparison means fetching a current time-based count from said single count means to compare said fetched current time-based count with a predetermined value stored in said second storage and comparison means, said second storage and comparison means generating an output signal only when said fetched current time-based count and said predetermined value stored in said second storage and comparison means are equal; and
    bistable means connected to said control signal of said first storage and comparison means and to said output of said second storage and comparison means for generating binary digit pulse signals according to said control signal and said output of said second storage and comparison means.

2. A pulse generating circuit as claimed in claim 1, further comprising:
    count clear means connected to said single count means and said first and second storage and comparison means, said count clear means clearing said single count means when said control signal causes said controllable selecting means to shift from said third transmission line to said second transmission line.

3. A pulse generating circuit as claimed in claim 2, wherein prior to a transmission of said reference signal, said predetermined values corresponding to said event-based count and said time-based count are stored in said first and second storage and comparison means, respectively.

4. A pulse generating circuit as claimed in claim 1, wherein said controllable selecting means selects said clock signals corresponding to said event-based count and subsequently selects said clock signals corresponding to said time-based count.

5. A pulse generating circuit as claimed in claim 4, wherein said pulse generating circuit generates a pulse signal at a time determined by said event-based count, a width of said pulse signal being determined by said time-based count stored in said second storage and comparison means.

6. A pulse generating circuit as claimed in claim 1, wherein said bistable means comprises an SR flip-flop circuit.

7. A pulse generating circuit as claimed in claim 1, wherein said single count means comprises a timer for counting clock signals.

8. A pulse generating circuit for microcomputer comprising:
    a single count means for conducting both a time-based clock count and an event-based clock count,
    a first transmission line for transmitting a reference signal to said single count means, said reference signal causing said single count means to be cleared for a subsequent initiation of a count;
    a second transmission line for transmitting clock signals corresponding to said time-based count;
    a third transmission line for transmitting clock signals corresponding to said event-based count;
    controllable selecting means connected to said second and third transmission lines and connected to said single count means for selecting one of said clock signals corresponding to said time-based count and to said event-based count, said selected clock signal being input to said single count means;

a first storage and comparison means connected to said single count means for storing values corresponding to said time-based count, said first storage and comparison means fetching a current time-based count from said single count means to compare said fetched time-based count with a predetermined value stored in said first storage and comparison means, said first storage and comparison means being connected to said controllable selecting means, an output of said first storage and comparison means supplying a control signal to said controllable selecting means only when said current count value of said single count means and said predetermined value stored in said controllable selecting means are equal, said control signal causing said controllable selecting means to shift from said second transmission line for transmitting clock signals corresponding to said time-based count to said third transmission line for transmitting clock signals corresponding to said event-based count;

a second storage and comparison means connected to said single count means for storing values corresponding to said event-based count, said second storage and comparison means fetching a current event-based count from said single count means to compare said fetched current event-based count with a predetermined value stored in said second storage and comparison means, said second storage and comparison means generating an output signal only when said fetched current event-based count and said predetermined value stored in said second storage and comparison means are equal; and bistable means connected to said control signal of said first storage and comparison means and to said output of said second storage and comparison means for generating binary digit pulse signals according to values of said control signal and said output signal of said second storage and comparison means.

9. A pulse generating circuit as claimed in claim 8, further comprising:

count clear means connected to said single count means and said first and second storage and comparison means, said count clear means clearing said single count means when said control signal causes said controllable selecting means to sift from said second transmission line to said third transmission line.

10. A pulse generating circuit as claimed in claim 9, wherein prior to said transmission of said reference signal, said predetermined values corresponding to said time-based count and said event-based count are stored in said first and second storage and comparison means, respectively.

11. A pulse generating circuit as claimed in claim 8, wherein said controllable selecting means selects said clock signals corresponding to said time-based count and subsequently selects said clock signals corresponding to said event-based count.

12. A pulse generating circuit as claimed in claim 11, wherein said pulse generating circuit generates a pulse signal at a time determined by said time-based count, a pulse width of said pulse signal being determined by said event-based count.

13. A pulse generating circuit as claimed in claim 8, wherein said bistable means comprises an SR flip-flop circuit.

14. A pulse generating circuit as claimed in claim 8, wherein said single count means comprises a timer for counting clock signals.

* * * * *